US010688832B2

(12) United States Patent
Matsuzawa et al.

(10) Patent No.: US 10,688,832 B2
(45) Date of Patent: Jun. 23, 2020

(54) PNEUMATIC TIRE

(71) Applicant: BRIDGESTONE CORPORATION, Chuo-ku, Tokyo (JP)

(72) Inventors: Kazutaka Matsuzawa, Kodaira (JP); Shun Oogane, Kodaira (JP); Yuki Kawakami, Kodaira (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 1256 days.

(21) Appl. No.: 13/896,770

(22) Filed: May 17, 2013

(65) Prior Publication Data
US 2013/0306210 A1 Nov. 21, 2013

(30) Foreign Application Priority Data

May 18, 2012 (JP) ................. 2012-114888

(51) Int. Cl.
B60C 11/13 (2006.01)
B60C 11/03 (2006.01)
B60C 23/19 (2006.01)

(52) U.S. Cl.
CPC .......... B60C 11/0327 (2013.01); B60C 11/13 (2013.01); B60C 23/19 (2013.01);
(Continued)

(58) Field of Classification Search
CPC . B60C 11/1353; B60C 11/0327; B60C 11/13; B60C 11/0306; B60C 11/0309;
(Continued)

(56) References Cited

U.S. PATENT DOCUMENTS 5,909,756 A * 6/1999 Miyazaki ............ B60C 9/2006
152/209.18
6,220,321 B1 * 4/2001 Yoshioka ............ B60C 11/0306
152/209.18
(Continued)

FOREIGN PATENT DOCUMENTS

CN 101734109 A 6/2010
CN 101746223 A 6/2010
(Continued)

OTHER PUBLICATIONS

Machine translation of JP07-096716 (no date).*
(Continued)

Primary Examiner — Steven D Maki
Assistant Examiner — Philip N Schwartz
(74) Attorney, Agent, or Firm — Sughrue Mion, PLLC

(57) ABSTRACT

An object of the present invention is to provide a pneumatic tire capable of facilitating heat dissipation of a tread portion thereof to lower temperature at the tread portion. Specifically, the present invention provides a pneumatic tire having in a tread surface at least one circumferential groove extending in the tire circumferential direction and plural lateral grooves, the lateral grooves each opening to the circumferential groove, having a wider groove width than the circumferential groove and extending to be inclined with respect to the tire circumferential direction, comprising: a recessed portion formed in a groove wall, facing the corresponding lateral groove, of the circumferential groove; and at least one projecting portion formed at a groove bottom of the circumferential groove between the recessed portions adjacent to each other in the tire circumferential direction.

1 Claim, 11 Drawing Sheets

(52) U.S. Cl.
CPC ....... *B60C 11/0306* (2013.01); *B60C 11/0309* (2013.01); *B60C 2011/0348* (2013.01); *B60C 2011/133* (2013.01); *B60C 2011/1361* (2013.01); *B60C 2200/065* (2013.01)

(58) Field of Classification Search
CPC ............. B60C 11/042; B60C 2011/133; B60C 2011/1361; B60C 2011/0348; B60C 23/18; B60C 23/19; B60C 2200/06; B60C 2200/065
See application file for complete search history.

(56) References Cited

U.S. PATENT DOCUMENTS

| | | | |
|---|---|---|---|
| 2004/0112492 A1 | 6/2004 | Kotanides, Jr. | |
| 2005/0126670 A1* | 6/2005 | Godefroid | B60C 11/0309 152/209.22 |
| 2006/0090828 A1* | 5/2006 | Yamane | B60C 11/0309 152/209.18 |
| 2008/0047644 A1 | 2/2008 | Yoshikawa et al. | |
| 2011/0005649 A1* | 1/2011 | Aoki | B60C 11/0306 152/209.1 |
| 2013/0306210 A1 | 11/2013 | Matsuzawa et al. | |
| 2014/0290817 A1* | 10/2014 | Kawakami | B60C 11/1307 152/209.18 |

FOREIGN PATENT DOCUMENTS

| | | | | |
|---|---|---|---|---|
| CN | 101801688 A | 8/2010 | | |
| CN | 102131657 A | 7/2011 | | |
| CN | 102196925 A | 9/2011 | | |
| EP | 0454657 A2 | 10/1991 | | |
| EP | 1541383 A2 | 6/2005 | | |
| EP | 1630006 A2 | 3/2006 | | |
| JP | 07096716 A | * 4/1995 | ............ | B60C 11/04 |
| JP | 7-232514 A | 9/1995 | | |
| JP | 11-34615 A | 2/1999 | | |
| JP | 2002240513 A | 8/2002 | | |
| JP | 2002-337514 A | 11/2002 | | |
| JP | 2003-205706 A | 7/2003 | | |
| JP | 2008-500923 A | 1/2008 | | |
| JP | 2008221964 A | 9/2008 | | |
| JP | 2008-302740 A | 12/2008 | | |
| JP | 5557875 B2 | 7/2014 | | |
| WO | WO-2013054950 A1 | * 4/2013 | ......... | B60C 11/1307 |
| WO | 2013172041 A1 | 11/2013 | | |

OTHER PUBLICATIONS

Communication dated Mar. 24, 2015 from the State Intellectual Property Office of People's Republic of China in counterpart Application No. 201380026098.1.
Japanese Office Action, dated Dec. 24, 2013, issued in corresponding Japanese Patent Application No. 2012-114888.
Communication dated Jan. 22, 2015, issued by the Australian Patent Office in corresponding Australian Application No. 2013260938.
Communication dated Dec. 12, 2014, issued by the Canadian Intellectual Property Office in corresponding Canadian Application No. 2,871,833.

* cited by examiner

Section B-B

Section C-C

Section D-D

PNEUMATIC TIRE

TECHNICAL FIELD

The present invention relates to a pneumatic tire capable of facilitating heat dissipation of a tread portion thereof to lower temperature at the tread portion, and more specifically such a pneumatic tire as described above particularly suitable for use in a construction vehicle.

BACKGROUND ART

Heat generated at a tread portion of a tire when the tire is rotated under load exerted thereon raises temperature at the tread portion, thereby causing various troubles such as heat separation at the tread portion. It is therefore necessary to reduce heat generation or facilitate heat dissipation at a tread portion of a tire in order to decrease temperature at the tread portion.

Conventionally, there has been employed in order to decrease temperature at a tread portion of tire a method of reducing an amount of tread rubber as heat source and increasing surface area of the tread portion to facilitate heat dissipation there by an increase in groove formation at the tread portion (e.g. Patent Literature 1).

CITATION LIST

Patent Literature

PTL 1: JP-A 2003-205706

SUMMARY OF THE INVENTION

Technical Problems

However, the method described above, which necessitates an increase in groove formation to enhance a temperature-decreasing effect, decreases rigidity of land portions of a tread of a tire due to the increase in groove formation, thereby resulting in deterioration of wear resistance and controllability of the tire.

In view of this situation, an object of the present invention is to provide a pneumatic tire capable of facilitating heat dissipation of a tread portion thereof to decrease temperature at the tread portion with suppressing an increase in groove area as best as possible.

Solution to the Problems

In order to achieve the aforementioned object, the present invention provides in a first aspect thereof a pneumatic tire having in a tread surface at least one circumferential groove extending in the tire circumferential direction and plural lateral grooves, which lateral grooves each open to the circumferential groove, have a wider groove width than the circumferential groove and extend optionally to be inclined with respect to the tire circumferential direction, comprising: a recessed portion formed in a groove wall, facing the corresponding lateral groove, of the circumferential groove; and at least one projecting portion formed at a groove bottom of the circumferential groove between the recessed portions adjacent to each other in the tire circumferential direction.

The recessed portion formed in the groove wall facing the corresponding lateral grooves, of the circumferential groove, is directly opposed to these corresponding lateral grooves.

Due to the first aspect of the present invention, it is possible to facilitate heat dissipation of a tread portion of a tire to decrease temperature at the tread portion without sacrificing rigidity of land portions so much because an increase in groove area is suppressed to the minimum.

In a second aspect of the pneumatic tire of the present invention, the projecting portion preferably extends from one groove wall on one side to another groove wall on the other side, facing the one groove wall, of the circumferential groove.

Due to the structure of the second aspect of the present invention, air flowing at the bottom of the circumferential groove is stirred up so that heat transfer efficiency between the bottom portion and the groove wall portions of the circumferential groove improves.

In a third aspect of the pneumatic tire of the present invention, provided that angle $\theta 1$ and angle $\theta 2$ are formed by one groove wall face and another groove wall face constituting the recessed portion, respectively, with respect to an imaginary extension of a groove wall extending in the tire circumferential direction, of the circumferential groove, in a plan view of the tread, it is preferable that $\theta 1 < \theta 2$ and the recessed portion has an unsymmetrical configuration in the plan view. Further, it is preferable that in the plan view of the tread the projecting portion is inclined with respect to the direction orthogonal to the circumferential groove and that the groove wall face, forming the angle $\theta 2$, of the recessed portion is inclined in the same direction with respect to the circumferential groove as the projecting portion is inclined with respect to the circumferential groove.

Due to the structure of the third aspect of the present invention, it is possible to avoid unnecessary interference between the recessed portion and the projecting portion and provide the maximum number of the projecting portions (in the vicinities of the groove wall face, forming the angle $\theta 2$, of the recessed portion in particular).

Specifically, the groove wall on the side where the recessed portions are formed, of the circumferential groove, has shorter circumferential length than the groove wall on the other side, facing the recessed portion-side groove wall, of the circumferential groove by the circumferential lengths of the recessed portions. Further, the unsymmetrical configuration of the recessed portion necessitates providing the recessed portion at a position slightly shifted from an opening of the lateral groove where the lateral groove communicates with the circumferential groove. In such a situation as described above, the maximum number of the projecting portions can be efficiently provided at the bottom of the circumferential groove by inclining the projecting portion in the same direction with respect to the circumferential groove as the groove wall face, forming the angle $\theta 2$, of the recessed portion is inclined with respect to the circumferential groove in the plan view of the tread.

In the pneumatic tire of the present invention, provided that angle $\theta 1$ and angle $\theta 2$ are formed by one groove wall face and another groove wall face constituting the recessed portion, respectively, with respect to an imaginary extension of a groove wall extending in the tire circumferential direction, of the circumferential groove, in a plan view of the tread, it is preferable that $\theta 1 < \theta 2$ and the recessed portion has an unsymmetrical configuration in the plan view, as described above. In this connection, in a fourth aspect of the pneumatic tire of the present invention, it is preferable that the projecting portions are formed between the recessed portions adjacent to each other in the tire circumferential direction and at a position in the vicinity of the groove wall face, forming the angle $\theta 2$, of the recessed portion.

Due to the structure of the fourth aspect of the present invention, the projecting portions are provided at portions where heat is not smoothly dissipated, whereby it is possible to effectively dissipate heat from the tread portion.

In the pneumatic tire of the present invention, provided that angle θ1 and angle θ2 are formed by one groove wall face and another groove wall face constituting the recessed portion, respectively, with respect to an imaginary extension of a groove wall extending in the tire circumferential direction, of the circumferential groove, in a plan view of the tread, it is preferable that θ1<θ2 and the recessed portion has an unsymmetrical configuration in the plan view, as described above. In this connection, in a fifth aspect of the pneumatic tire of the present invention, it is preferable that: the lateral groove is inclined with respect to the tire widthwise direction such that an obtuse angle (θ1) and an acute angle (θ2) are formed by one groove wall and another groove wall facing the one groove wall of the lateral groove with respect to a groove wall of the circumferential groove, respectively, in a plan view of the tread; and the groove wall face forming the angle θ1, of the recessed portion, is disposed on the side of the obtuse angle and the groove wall face forming the angle θ2, of the recessed portion, is disposed on the side of the acute angle.

Due to the structure of the fifth aspect of the present invention, air flow from the lateral groove can be facilitated, thereby advantageously increasing an amount of air introduced into the circumferential groove.

In a sixth aspect of the pneumatic tire of the present invention, an opening area of the recessed portion in a plan view of the tread preferably decreases from the tread surface toward the bottom of the circumferential groove.

Due to the structure of the sixth aspect of the present invention, pebble-biting preventing properties of the recessed portion can be significantly improved.

The pneumatic tire of the present invention is preferably used for a construction vehicle.

A tire for a construction vehicle has a large volume of rubber and the aforementioned heat generation problem in particular may conspicuously occur therein. Therefore, the pneumatic tire of the present invention is especially effective when it is used for a construction vehicle.

Advantageous Effect of the Invention

According to the present invention, it is possible to provide a pneumatic tire capable of facilitating heat dissipation of a tread portion thereof to lower temperature at the tread portion.

DESCRIPTION OF THE EMBODIMENTS

A pneumatic tire of the present invention will be described in detail hereinafter by a demonstrative embodiment with reference to drawings.

Hereinbelow, a pneumatic tire in an unworn state will be described.

Figure 1:
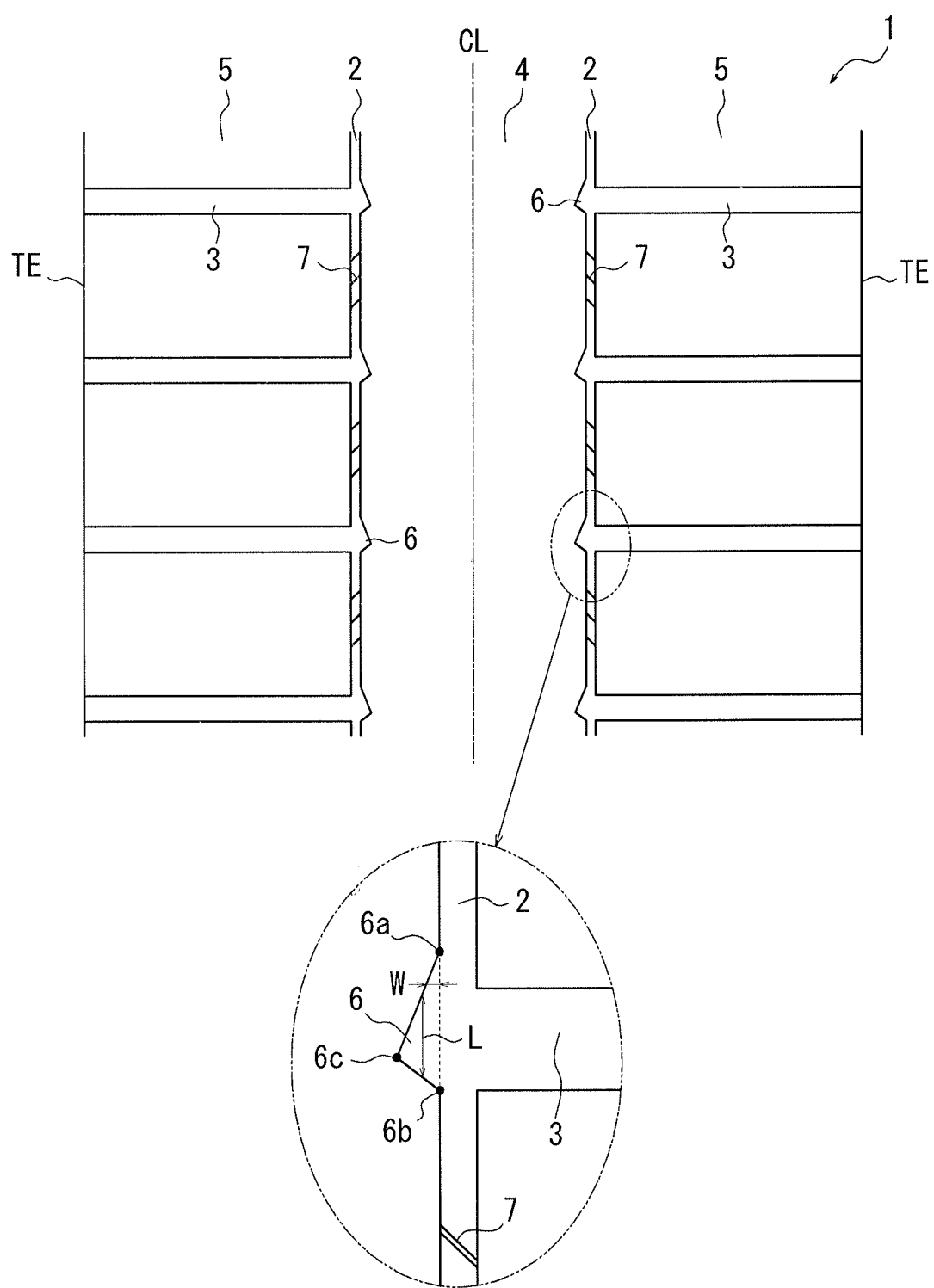
FIG. 1 is a development view of a tread pattern of a pneumatic tire of the present invention.

FIG. 1 is a development view of a tread pattern of a pneumatic tire for a construction vehicle. The pneumatic tire has in a tread surface 1: a pair of circumferential grooves 2 extending in the tire circumferential direction with the tire equatorial line CL therebetween; and plural lateral grooves 3 each opening to the corresponding circumferential groove 2, having a wider groove width than the circumferential groove 2 and extending in the tire widthwise direction. Each lateral groove 3 communicates with a corresponding tread end TE.

A rib-shaped center land portion 4 including the tire equatorial line CL is demarcated by the circumferential grooves 2 and a block-shaped land portions 5 are demarcated by the circumferential grooves 2 and the lateral grooves 3.

It should be noted that the tread pattern shown in FIG. 1 is merely an example and the present invention is applicable to each of a rib-based tread pattern and a block-based tread pattern. Further, the lateral groove 3 may be inclined with respect to the tire widthwise direction (preferably by an inclination angle in the range of 15° to 45° with respect to the tire widthwise direction), need not communicate with the tread end TE, and the groove width thereof need not be constant and may vary. The circumferential groove 2 need not be linear and may have a zigzag or wavy configuration.

A recessed portion 6 is formed in a groove wall, facing the corresponding lateral groove 3, of the circumferential groove 2 in the rib-shaped center land portion 4.

The length W in the tire widthwise direction of each recessed portion 6 changes along the tire circumferential direction, as shown in an enlarged view of FIG. 1. Specifically, the length W gradually increases from a connection point 6a of the recessed portion 6 with the circumferential groove 2 toward a summit 6c of the recessed portion 6 and then gradually decreases from the summit 6c toward another connection point 6b of the recessed portion 6 with the circumferential groove 2. Further, the length L in the tire circumferential direction of the recessed portion 6 decreases from the exterior side, opening to the circumferential groove 2, toward the inner side thereof. Specifically, the length L is largest between the connection point 6a and the connection point 6b and gradually decreases toward the summit 6c.

The groove wall, facing the corresponding lateral groove 3, of the circumferential groove 2 will be described with reference FIG. 2.

Figure 2A:
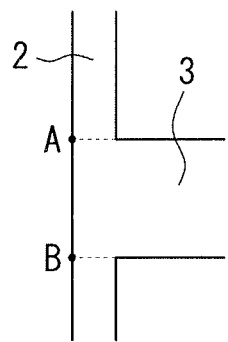
FIGS. 2A-2F are explanatory views each showing a position where a recessed portion can be disposed.

In a case where the recessed portion 6 is not formed, the "groove wall, facing the corresponding lateral groove 3, of the circumferential groove 2" is defined as a portion between "point A" and "point B" of a groove wall of the circumferential groove 2 shown in FIG. 2A, wherein "point A" and "point B" represent intersections of imaginary extension lines of respective groove walls of the lateral groove 3 with the groove wall of the circumferential groove 2, respectively.

Figure 2B:
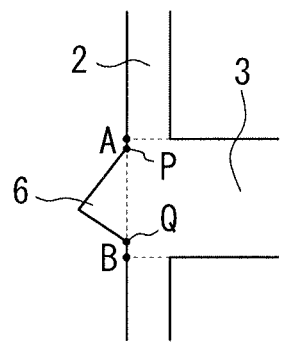
Figure 2C:
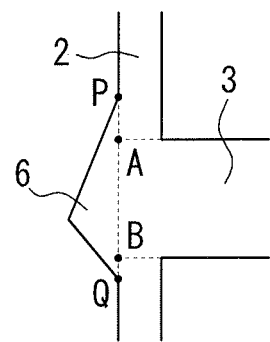
Figure 2D:
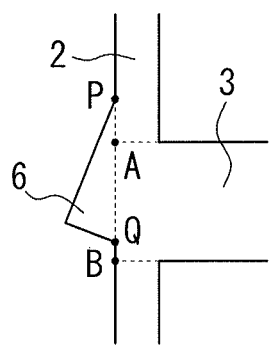

The recessed portion 6 may be formed either between point A and point B, as shown in FIG. 2B, or to extend beyond point A and point B, as shown in FIG. 2C. Further, it is acceptable that one of the connection points P of the recessed portion 6 with the circumferential groove 2 is formed between point A and point B and the other connection point Q is formed beyond point A/point B, as shown in FIG. 2D. In short, it suffices that at least a portion of the recessed portion 6 is formed between point A and point B.

Figure 2E:
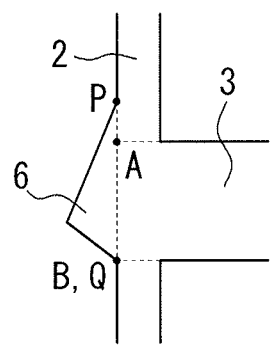

It is preferable that one of the connection points P, Q of the recessed portion 6 with the circumferential groove 2 is formed beyond the section between point A and point B and the other connection point is formed to coincide with point B, as shown in FIG. 2E.

Figure 2F:
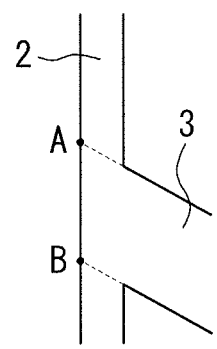

In a case where the lateral groove 3 is inclined with respect to the tire widthwise direction as shown in FIG. 2F, the groove wall, facing the corresponding lateral groove 3, of the circumferential groove 2 is defined as a portion between point A and point B of a groove wall of the circumferential groove 2 as shown in FIG. 2F, wherein point A and point B represent intersections of imaginary extension lines of respective groove walls of the lateral groove 3 with the groove wall of the circumferential groove 2, respectively. The recessed portion 6 then can be disposed in manners similar to those shown in FIGS. 2B to 2E in relation to point A and point B thus determined.

It should be noted that line PQ linking the connection points P, Q is in parallel to and at least partially coincides with line AB linking points A, B.

Again referring to FIG. 1, three projecting portions 7 are formed at the groove bottom of the circumferential groove 2 between the recessed portions 6 adjacent to each other in the tire circumferential direction. These projecting portions 7 will be described with reference to FIG. 3 as a partially-exploded perspective view of the circumferential groove 2 and FIG. 4 as a partially-enlarged plan view of the circumferential groove 2.

The projecting portion 7 extends from one groove wall 21 on one side to another groove wall 22 on the other side, facing the one groove wall, of the circumferential groove 2. Specifically, the projecting portion 7 is formed across the whole groove width W2 of the circumferential groove 2.

The projecting portion 7 is formed to rise from the groove bottom 23 of the circumferential groove 2 toward the outer side in the tire radial direction. The projecting portion 7 is made of e.g. a flat plate-like rubber.

An effect of the present invention will be described hereinafter.

Figure 5:
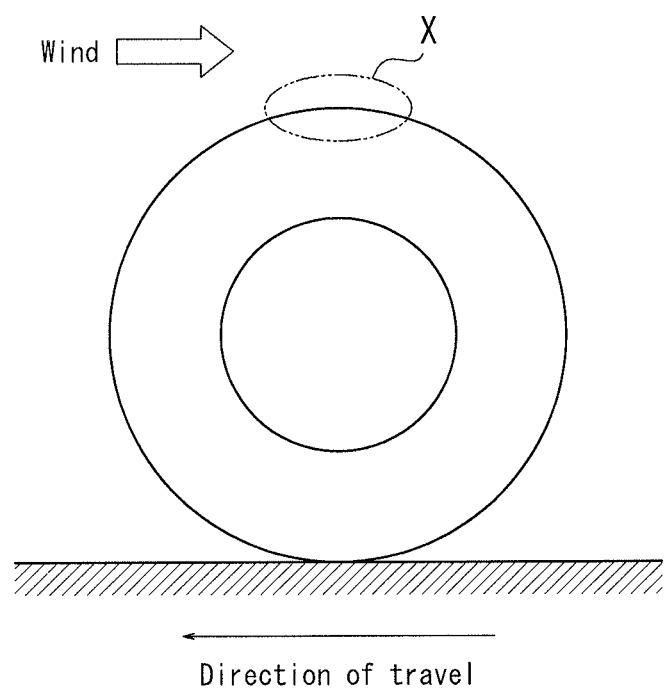
FIG. 5 is a view explaining an effect of the present invention.

When a tire is rotated, wind flows in the vicinities of the tire in the direction opposite to the direction of travel, as shown in FIG. 5. This wind is introduced into the grooves formed in the tread surface 1 and then discharged therefrom, so that heat is dissipated from a tread portion and temperature at the tread portion is lowered. Such a heat-dissipating effect by introducing wind into grooves as described above is conspicuous in a pneumatic tire for a construction vehicle, in particular, because in the tire for a construction vehicle the vehicle side thereof as indicated by circle X in FIG. 5, i.e. the side thereof opposite to the ground-contacting side, is not covered by a vehicle but exposed.

In this connection, increasing groove widths of the grooves formed in the tread surface 1 to introduce as much wind as possible into the grooves inevitably reduces rigidity of the land portions to deteriorate wear resistance and controllability of the tire. It is therefore necessary to find a method for lowering temperature at the tread portion without significantly increasing groove widths of the existent grooves.

Figure 6A:
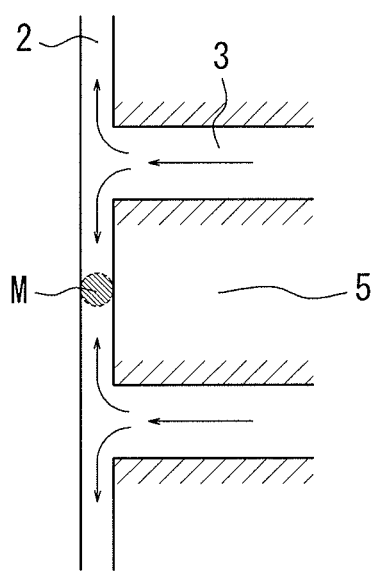
FIGS. 6A-6C are views each explaining an effect of the present invention.

The inventors of the present invention, as a result of a study on wind flow within these grooves, discovered that a tread pattern having narrow circumferential grooves 2 and wide lateral grooves 3 formed therein, as shown in FIG. 6A, experiences relatively high temperature at the middle point between the lateral grooves 3 adjacent to each other in the tire circumferential direction.

Temperature at each of the block-shaped land portions 5 increases when the tire is rotated under load exerted thereon but heat is dissipated from portions near to the lateral grooves 3 (indicated as hatched portions in FIG. 6A), of the block-shaped land portion 5, due to wind flowing in the lateral grooves 3, whereby temperature at the portions drops. In contrast, heat is not smoothly dissipated from a portion remote from the lateral grooves 3, of the block-shaped land portion 5. Wind flows in each of the lateral grooves 3 from the corresponding tread end TE toward the corresponding circumferential groove 2, as indicated by arrows in FIG. 6A. This wind collides with the groove wall, facing the lateral groove 3, of the circumferential groove 2, to be branched or dispersed into a normal direction and a reverse direction with respect to the tire rotation direction. In a case where the lateral groove 3 is formed orthogonal to the circumferential groove 2 as shown in FIG. 6A, the wind which has collided with the groove wall is then equally dispersed into the normal direction and the reverse direction, respectively. Accordingly, wind introduced from one lateral groove 3 into the circumferential groove 2 and flowing in the normal direction, collides with wind introduced from another lateral groove 3 adjacent to the one lateral groove 3 on the normal direction side in the tire circumferential direction into the circumferential groove 2 and flowing in the reverse direction, at point M, which is the intermediate position or the middle point between the two lateral grooves 3 in this case. Wind flows are then stuck at point M, thereby causing a situation in which heat is no longer smoothly dissipated from the block-shaped land portion 5.

It should be noted that heat is not so efficiently dissipated in a portion adjacent to the circumferential groove 2, of the block-shaped land portion 5, as in the portions adjacent to the lateral grooves 3 thereof because groove width of the circumferential groove 2 is narrower than those of the later grooves 3.

Figure 6B:
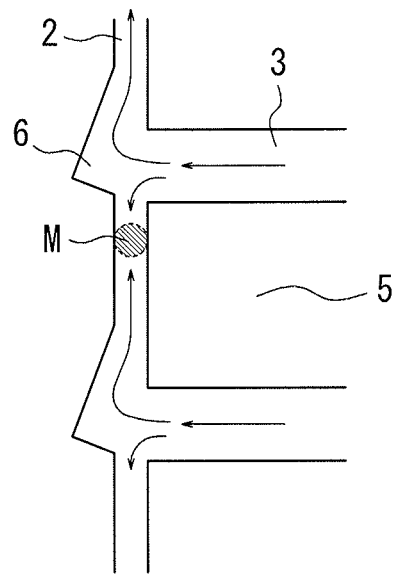

In view of this, the recessed portion 6 is formed in a groove wall, facing the corresponding lateral groove 3, of the circumferential groove 2 as shown in FIG. 6B in the present invention, so that wind flowing from the lateral grooves 3 into the circumferential groove 2 is unevenly dispersed in the circumferential groove 2. In this case, point M where winds in opposite directions collide with each other in the circumferential groove 2 is shifted to a position close to the one lateral groove 3 as shown in FIG. 6B, whereby wind smoothly flows in the circumferential groove 2 at the hottest portion of the block-shaped land portion 5 (i.e. the intermediate portion in the tire circumferential direction of the block-shaped land portion 5) to efficiently lower temperature at the portion of the block-shaped land portion and thus the tread portion.

Figure 6C:
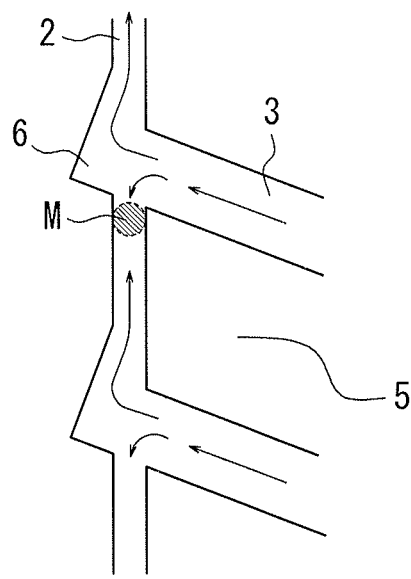

It is preferable to form the lateral grooves 3 to be inclined with respect to the tire widthwise direction and provide such lateral grooves 3 with the recessed portions 6, as shown in FIG. 6C, because wind flowing from the lateral grooves 3 into the circumferential groove 2 is then more unevenly dispersed in the circumferential groove 2 and thus point M where winds in opposite directions collide with each other in the circumferential groove 2 can be shifted to a position further closer to the one lateral groove 3 as shown in FIG. 6C.

Further, it should be noted that boundary layers (layers where wind flows at relatively low speed) are generated at the groove bottom of the circumferential groove 2. In this connection, the projecting portions 7 provided at the groove bottom of the circumferential groove 2 modify air flow above the boundary layer or on the tread surface 1 side, which air flow moves more rapidly than the air of the boundary layer, to successfully generate turbulences, whereby heat exchange is vigorously carried out between the groove bottom and the groove walls of the circumferential groove 2 and thus heat of the rib-shaped center land portion 4 and the block-shaped land portions 5 adjacent to the circumferential grooves 2 can be smoothly dissipated.

Figure 7:
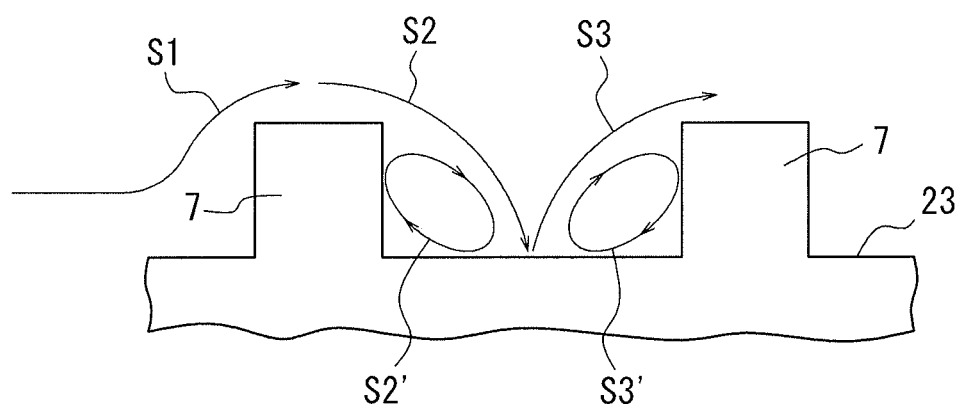
FIG. 7 is a view explaining an effect of the present invention.

Specifically, wind flowing (in the reverse direction) through the circumferential groove 2 (main stream S1) rises up or detached from the groove bottom 23 and climbs over the projecting portion 7, as shown in FIG. 7 as a sectional view of the bottom portion of the circumferential groove 2 cut along the extending direction thereof. The wind which has climbed over the projection 7 (main stream S2) then continuously flows down with accelerating velocity toward the back (rear) side in the tire rotation direction, of the projecting portion 7. The main stream S2 thus accelerated eventually flows down vertically toward the groove bottom 23, i.e. becomes a descending flow, at the back side of the projecting portion 7 and the descending flow then becomes main stream 3, flows continuously, climbs over the next projecting portion 7 and accelerates again. Fluid S2', which would otherwise be stuck on the back side of the projecting portion 7, is pulled and rotated by the main stream S2, deprives the nearby portion of heat when it is rotated, and flows into the main stream S2. Similarly, fluid S3', which would otherwise be stuck on the front side in the tire rotation direction, of the projecting portion 7, is pulled and rotated by the main stream S3, deprives the nearby portion of heat when it is rotated, and flows into the main stream S3.

In short, the main streams S1, S2 and S3 climb over the projections 7 with repeated accelerations, whereby the fluids S2' and S3' deprive the groove bottom 23 of heat and flow into the main streams S2 and S3 to decrease temperature of the tire across a wide range thereof.

The main streams S1, S2 and S3 are actually continuous, although they are depicted to look discontinuous for an explanatory purpose in FIG. 7.

Various types of modified examples of the recessed portion 6 and the projecting portion 7 will be described hereinafter.

Figure 8A:
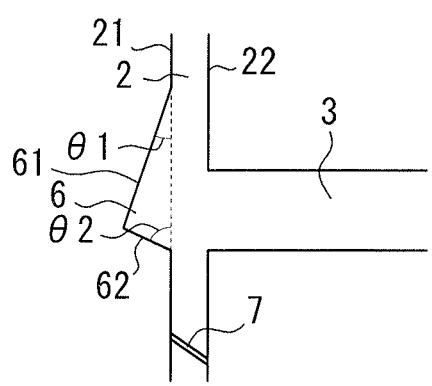
FIGS. 8A-8D are views each showing a modified example of the recessed portion.

As shown in FIG. 8A, provided that angle $\theta1$ and angle $\theta2$ are formed by one groove wall face 61 and another groove wall face 62 constituting the recessed portion 6, respectively, with respect to an imaginary extension of a groove wall 21 extending in the tire circumferential direction, of the circumferential groove 2, in a plan view of the tread, it is preferable that $\theta1<\theta2$ and the recessed portion 6 has an unsymmetrical triangular configuration in the plan view.

In this case, it is preferable that in the plan view of the tread the groove wall face 62, forming the angle $\theta2$, of the recessed portion 6 is inclined in the same direction with respect to the circumferential groove 2 as the projecting portion 7 is inclined with respect to the circumferential groove 2. As a result of the structure described above, it is possible to avoid unnecessary interference between the recessed portion 6 and the projecting portion 7 and provide the maximum number of the projecting portions 7 (in the vicinities of the groove wall face 62, forming the angle $\theta2$, of the recessed portion in particular).

Further, in the case where the recessed portion 6 has an unsymmetrical configuration in the plan view of the tread such that $\theta1<\theta2$, it is preferable that the projecting portions 7 are formed at a position in the vicinity of the groove wall face 62 forming the angle $\theta2$ and between the recessed portions 6, 6 adjacent to each other in the tire circumferential direction, i.e. a position in the circumferential groove 2, closer to the groove wall face 62 than the intermediate position between the two lateral grooves 3, 3 adjacent in the tire circumferential direction.

When the recessed portion 6 having such an unsymmetrical configuration as described above is formed, heat is still not smoothly dissipated around point M near to the groove wall face 62 because winds flowing in opposite directions collide with each other at point M, as explained with reference to FIG. 6B above. However, heat can be effectively dissipated from the tread portion by forming the projecting portion(s) 7 at a position in the vicinity of the groove wall face 62 forming the angle $\theta2$.

Figure 8B:
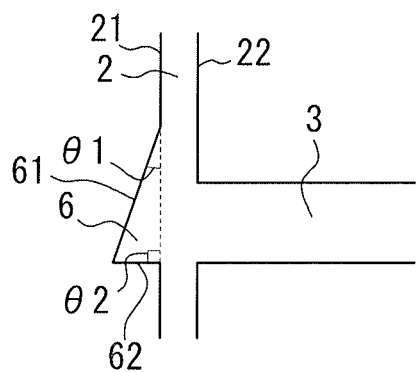

$\theta2$ may be equal to 90°, as shown in FIG. 8B.

Figure 8C:
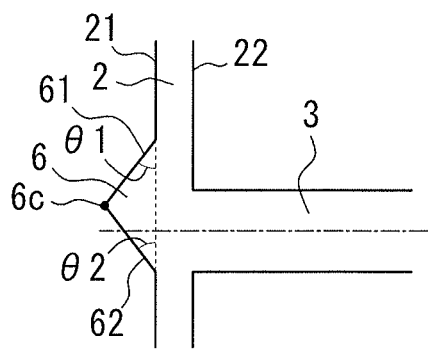

Further, the recessed portion 6 may have an isosceles triangular configuration (i.e. $\theta1=\theta2$), as shown in FIG. 8C. However, the recessed portion 6 must be formed such that it is offset with respect to the lateral groove 3 in this case. Specifically, the recessed portion 6 must be formed such that the summit 6c thereof does not exist on the center line of the lateral groove 3 (shown in one-dot line in FIG. 8C). If the summit 6c exists on the center line of the lateral groove 3, wind cannot be unevenly dispersed and thus heat dissipation from the tread portion cannot be carried out effectively.

Figure 8D:
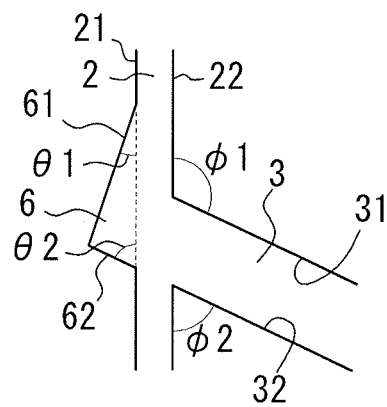

It is acceptable that: the lateral groove 3 is inclined with respect to the tire widthwise direction such that an obtuse angle ($\phi1$) and an acute angle ($\phi2$) are formed by one groove wall 31 and another groove wall 32 of the lateral groove 3 with respect to a groove wall 22 of the circumferential groove 2, respectively, in a plan view of the tread; and the groove wall face 61 forming the angle $\theta1$, of the recessed portion 6, is disposed on the side of the obtuse angle $\phi1$ and the groove wall face 62 forming the angle $\theta2$, of the recessed portion 6, is disposed on the side of the acute angle $\phi2$, as shown in FIG. 8D.

As a result of the structure described above, air flow from the lateral groove 3 can be facilitated, thereby advantageously increasing an amount of air introduced into the circumferential groove 2.

Figure 9A:
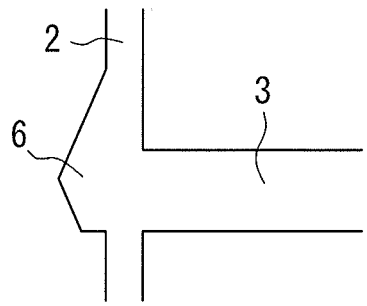
FIGS. 9A-9B are views each showing a modified example of the recessed portion.
Figure 9B:
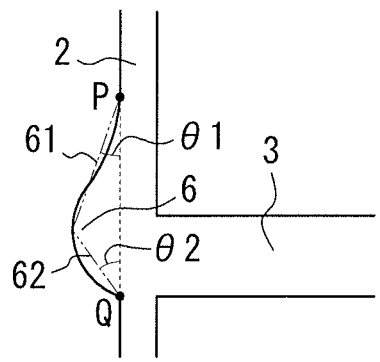

Yet further, the recessed portion 6 may have a quadrilateral configuration as shown in FIG. 9A or a rounded configuration as shown in FIG. 9B, other than a triangular configuration, in a plan view of the tread. In a case where the recessed portion 6 has such a rounded configuration as shown in FIG. 9B, the aforementioned angles $\theta1$ and $\theta2$ can be determined by: plotting the two recess-starting points and the deepest point of the recessed portion 6 on the groove wall of the circumferential groove 2; linking these three points; and measuring angles corresponding to the angles θ1 and θ2, as shown in FIG. 9B.

It should be noted that line PQ linking the connection points P, Q thus determined is in parallel to and at least partially coincides with line AB linking points A, B in the rounded configuration as shown in FIG. 9B, as well.

Figure 10A:
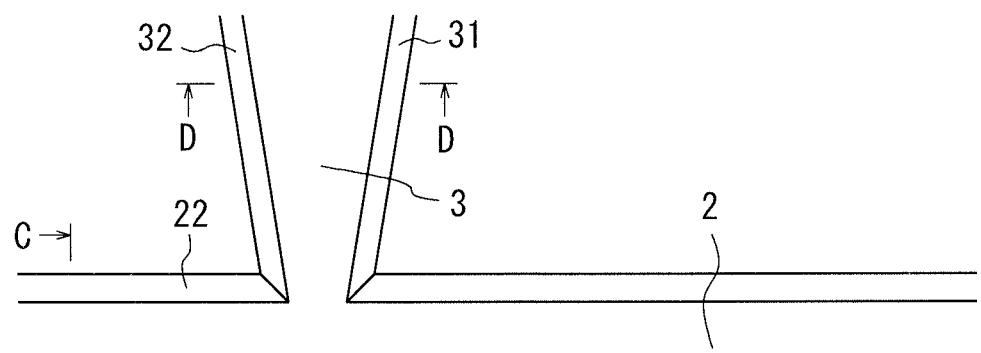
FIGS. 10A-10D are views each showing a modified example of the recessed portion.
Figure 10B:
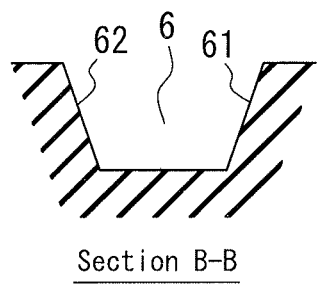
Figure 10C:
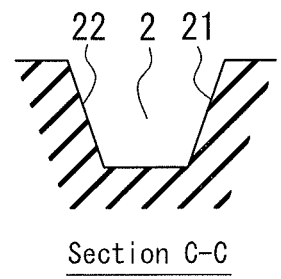
Figure 10D:
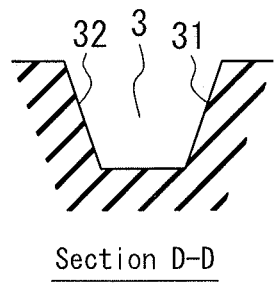

An opening area of the recessed portion 6 in a plan view of the tread surface 1 preferably gradually decreases from the tread surface 1 toward the bottom of the circumferential groove 2, as shown in FIG. 10A. In other words, the groove wall face 61 and the groove wall face 62 of the recessed portion 6 are preferably inclined in the depth direction toward the groove bottom, as shown in FIG. 10B as a sectional view of FIG. 10A cut along the line B-B. Similarly, an opening area of the circumferential groove 2 in a plan view of the tread surface 1 preferably gradually decreases from the tread surface 1 toward the bottom of the circumferential groove 2. In other words, the groove wall 21 and the groove wall 22 of the circumferential groove 2 are preferably inclined in the depth direction toward the groove bottom, as shown in FIG. 10C as a sectional view of FIG. 10A cut along the line C-C. Further, an opening area of the lateral groove 3 in a plan view of the tread surface 1 preferably gradually decreases from the tread surface 1 toward the bottom of the lateral groove 3. In other words, the groove wall 31 and the groove wall 32 of the lateral groove 3 are preferably inclined in the depth direction toward the groove bottom, as shown in FIG. 10D as a sectional view of FIG. 10A cut along the line D-D.

As a result of the structures described above, pebble-biting preventing properties of the recessed portion 6, the circumferential groove 2 and the lateral groove 3 can be significantly improved.

The length L in the tire circumferential direction and the length W in the tire widthwise direction of the recessed portion 6 in a plan view of the tread surface 1, as shown in FIG. 1, are preferably 150 mm or less and 50 mm or less, respectively. The recessed portions 6 having too large dimensions may deteriorate wear resistance of the tire. The recessed portions 6 having too small dimensions may not cause the effect of changing the manner of dispersion of wind within the circumferential groove 2 in a satisfactory manner.

It suffices that the recessed portion 6 is provided at least in a portion ranging from the tread surface 1 to the groove bottom of the groove wall. However, the recessed portion 6 is provided preferably at least at the groove bottom and more preferably across the whole range from the groove bottom to the tread surface as shown in FIG. 1.

Temperature of the block-shaped land portion 5 is relatively high on the groove bottom side thereof, i.e. the side thereof close to a carcass within the tread, and decreases toward the tread surface 1. In view of this, provision of the recessed portion 6 at the groove bottom of the circumferential groove 2 is preferable because then the recessed portion 6 advantageously changes a direction of wind in the circumferential groove 2 at a portion having relatively high temperature of the tread.

Figure 3:
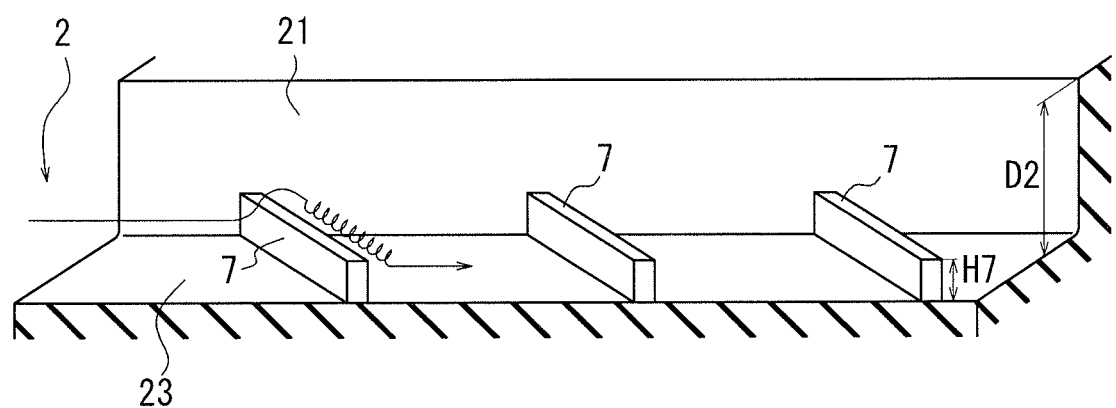
FIG. 3 is a partially-exploded perspective view of a circumferential groove.

It is preferable that the projecting portion 7 is inclined with respect to the circumferential groove 2 (more specifically, the groove center line WL of the circumferential groove 2) by an angle θ of less than 90° in a plan view of the tread (see FIG. 4) and stands upright with respect to the groove bottom of the circumferential groove 2 (see FIG. 3). Providing the projecting portion 7 to be so inclined with respect to the circumferential groove 2 as described above is advantageous because then wind which has climbed over the projecting portion 7 flows down with swirling from the groove wall 21 toward the groove wall 22, thereby further facilitating heat dissipation from the back side of the projecting portion 7, as shown in FIG. 3.

Figure 4:
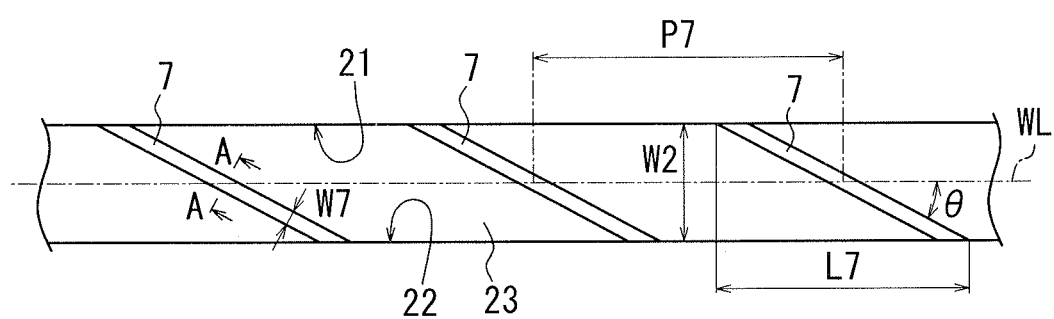
FIG. 4 is a partially-enlarged plan view of the circumferential groove.

Further, the angle θ formed by the projecting portion 7 with respect to the groove center line WL is more preferably in the range of 10° to 60°, as shown in FIG. 4. If the angle θ is less than 10°, an acute angle-portion formed between the projecting portion 7 and the groove wall 21 or 22 extremely weakens wind flow in the circumferential groove 2, thereby seriously disturbing efficient heat dissipation from the tread portion. In a case where the angle θ exceeds 60°, the effect of changing wind flowing in the circumferential groove 2 to swirling flows diminishes.

Provided that a projected length of the projecting portion 7 on the groove center line WL thereof is L7 and that the projecting portions 7 are provided with an interval P7 therebetween in the extension direction of the circumferential groove 2, it is preferable that the projecting portions 7 are disposed such that $0.75 \times L7 \leq P7 \leq 10 \times L7$ is satisfied.

If $P7 < 0.75 \times L7$, the number of the projecting portions 7 formed in the circumferential groove 2 is too large, whereby velocity of wind flowing in the circumferential groove 2 significantly decreases and heat dissipation from the tread portion may therefore not be carried out efficiently. If $P7 > 10 \times L7$, the effect of changing wind flowing in the circumferential groove 2 to swirling flows diminishes. It should be noted that the length L7 represents a length of one projecting portion 7 measured from one end to the other end thereof in the extending direction of the circumferential groove 2 (the tire circumferential direction in the example shown in FIG. 4) and that the interval P7 represents a distance between two points, which are: an intersection of one projecting portion with the groove center line WL; and an intersection of another projecting portion adjacent to the one projecting portion with the groove center line WL.

Provided that a height of the projecting portion 7 measured from the groove bottom 23 is H7 and a depth of the circumferential groove 2 measured from the tread surface 1 to the groove bottom 23 (i.e. the deepest portion of the circumferential groove 2) is D2, it is preferable that the projecting portions 7 are formed such that $0.03 \times D2 < H7 \leq 0.4 \times D2$ is satisfied.

If $H7 \leq 0.03 \times D2$, the height H7 of the projecting portion 7 is too low, whereby the effect of changing wind flowing in the circumferential groove 2 to swirling flows diminishes. If $H7 > 0.4 \times D2$, the height H7 of the projecting portion 7 is too high, whereby wind flowing in the circumferential groove 2 hardly reaches the groove bottom 23 and heat dissipation from the tread portion may therefore not be carried out efficiently.

Provided that the groove width of the circumferential groove 2 is W2, it is preferable that the groove bottom 23 is flat at least in a region spreading at least by a width of $0.1 \times W2$ from the groove center line WL on respective sides. When the center portion of the groove bottom 23 including the groove center line WL of the circumferential groove 2 lacks irregularities and a surface of the center portion is sufficiently flat, wind flow passing over the groove bottom 23 is not disrupted and heat dissipation from the tread portion can be further more efficiently carried out.

Figure 11A:
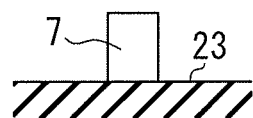
FIG. 11A is a sectional view cut along the A-A line of FIG. 4 and FIGS. 11B-11H are views each showing a modified example of a projecting portion.
Figure 11B:
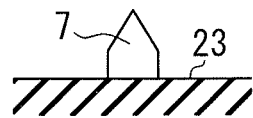
Figure 11C:
Figure 11D:
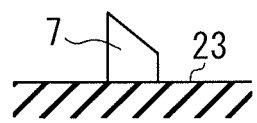
Figure 11E:
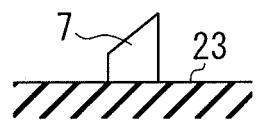
Figure 11F:
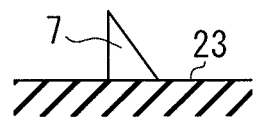
Figure 11G:
Figure 11H:
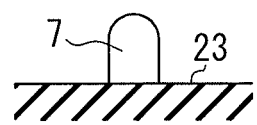

FIG. 11A is a sectional view cut along the A-A line of FIG. 4 and FIGS. 11B-11H are views each showing a modified example of a projecting portion. As shown in FIGS. 11B-11H, a vertical sectional configuration of the projecting portion 7 does not need to be flat at the upper end thereof.

Further, the configuration of the projecting portion 7 does not need to be restricted to a flat plate-like shape having a substantially constant thickness W7 as shown in FIG. 4 and may have in a plan view of the tread, any of: a wavy shape extending in a wavy manner with a substantially constant thickness W7; a shape being thick in the vicinities of the groove center line WL and diminishing toward the groove wall 21 and the groove wall 22; a shape being thin in the vicinities of the groove center line WL and increasing thickness toward the groove wall 21 and the groove wall 22; and the like.

The groove width W2 of the circumferential groove 2 is preferably in the range of 3 mm to 50 mm because a too narrow groove width W2 inhibits air flow and a too wide groove width W2 makes provision of the projecting portions and merger of the lateral grooves therewith insignificant and thus diminishes the effect of the present invention.

The groove width of the lateral groove 3 is preferably at least 5 mm because a too narrow groove width of the lateral groove 3 no longer allows air to flow through the lateral groove 3.

EXAMPLES

The present invention will be described by Examples hereinafter with no particular limitation thereto.

Test tires of Examples 1 to 12 each had the same tread pattern as shown in FIG. 1, except that positions of the projecting portions 7 and/or configurations of the recessed portions 6 were changed in the former. Test tires of Comparative Examples 1 to 5 each had the same tread pattern as that of Example 1 tire, except that the former lacked at least one of the recessed portion 6 and the projecting portion 7. The relevant details of specifications of these test tires (tire size: 53/80R63) are shown in Table 1.

Each of the test tires was assembled with a rim (rim width: 36 inches), inflated at a certain internal pressure (600 kPa) and subjected to an indoor drum test (load: 82.5 t, drum diameter: 5 m, and drum surface velocity: 8 km/hour), to measure temperature at the rib-shaped center land portion 4 adjacent to the circumferential groove 2 after running for 24 hours. The measurement results are shown in Table 1 in a summarized manner.

Figure 12A:
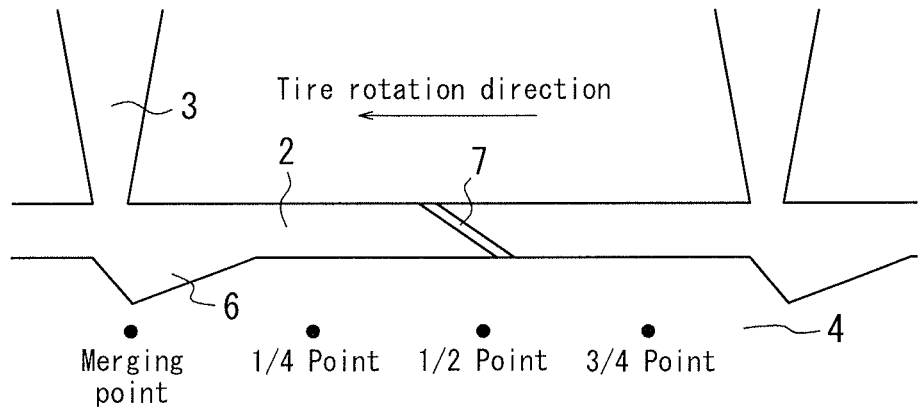
FIGS. 12A-12D are views showing the circumferential grooves of Example tires, respectively.

Sites for the temperature measurement were those shown in FIG. 12A. A "merging point" represents a position on the rib-shaped center land portion 4, which position is adjacent to the point where the circumferential groove 2 and the lateral groove 3 merge together. A "circumferential ½ point" represents a position on the rib-shaped center land portion 4, which position corresponds to the middle point between the two lateral grooves 3 adjacent to each other in the tire circumferential direction. A "circumferential ¼ point" and a "circumferential ¾ point" represent positions on the rib-shaped center land portion 4, which positions correspond to the middle point between a merging point in the leading side in the tire rotation direction and the circumferential ½ point and the middle point between a merging point in the trailing side in the tire rotation direction and the circumferential ½ point, respectively.

TABLE 1

Figure 12B:
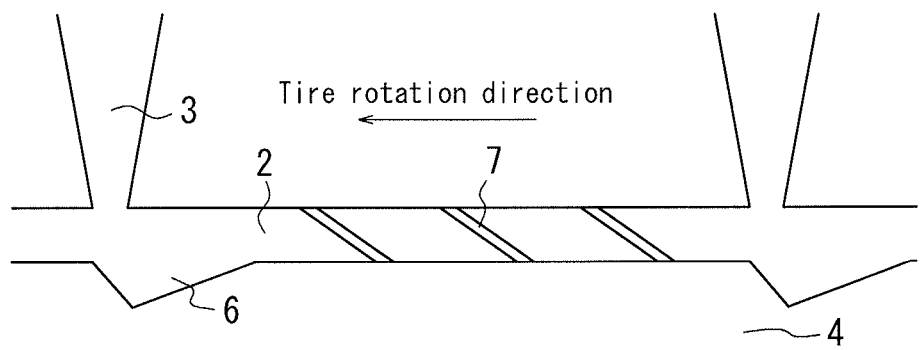

| Pattern | Comp. Example 1 FIG. 13A | Comp. Example 2 FIG. 13B | Comp. Example 3 FIG. 13C | Example 1 FIG. 12A[*1] | Example 2 FIG. 12A | Example 3 FIG. 12B | Example 4 FIG. 12C | Example 5 FIG. 12D | Example 6 FIG. 12C[*2] | Example 7 FIG. 8D |
|---|---|---|---|---|---|---|---|---|---|---|
| Recessed portion 6 | Absent | Present | Absent | Present | Present | Present | Present | Present | Present | Present |
| Number of projecting portions 7 between adjacent recessed portions 6 | None | None | 1 | 1 | 1 | 3 | 5 | 3 | 4 | 1 |
| Manner of disposing projecting portions 7 between recessed portions 6 | — | — | Equal interval | Equal interval | Equal interval | Equal interval | Equal interval | More in the trailing side | Equal interval | Equal interval |
| Temperature at merging point [° C.] | 80 | 75 | 80 | 75 | 75 | 75 | 75 | 75 | 75 | 74 |
| Temperature at circumferential 1/4 point [° C.] | 82 | 77 | 82 | 77 | 77 | 77 | 76 | 77 | 77 | 76 |
| Temperature at circumferential 1/2 point [° C.] | 85 | 81 | 85 | 81 | 81 | 80 | 79 | 80 | 80 | 80 |
| Temperature at circumferential 3/4 point [° C.] | 90 | 87 | 87 | 85 | 84 | 83 | 82 | 82 | 82 | 83 |

Figure 12C:
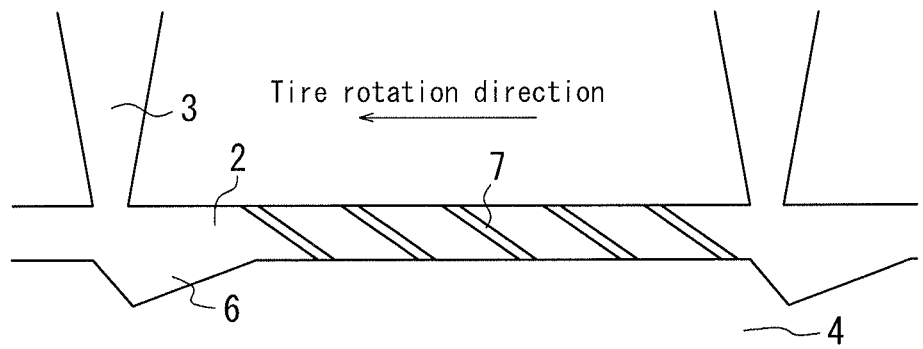
Figure 12D:
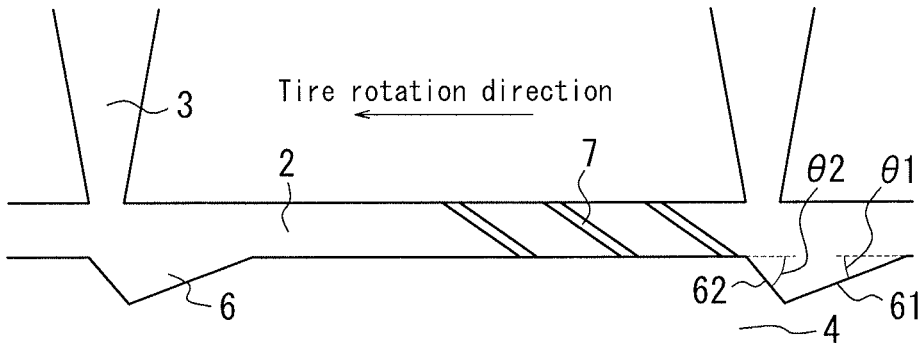
Figure 13A:
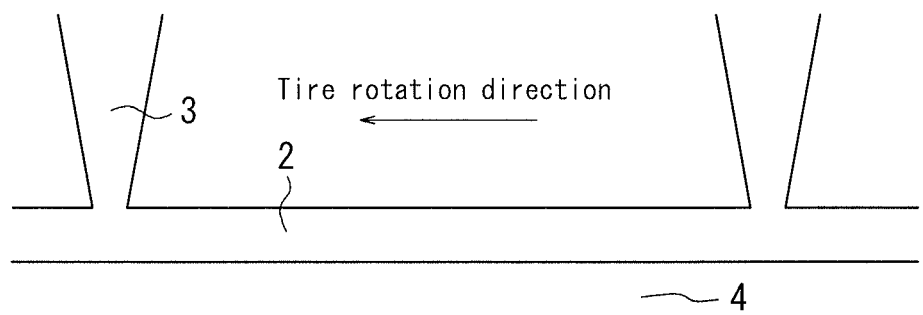
FIGS. 13A-13C are views showing the circumferential grooves of Comparative Example tires, respectively.
Figure 13B:
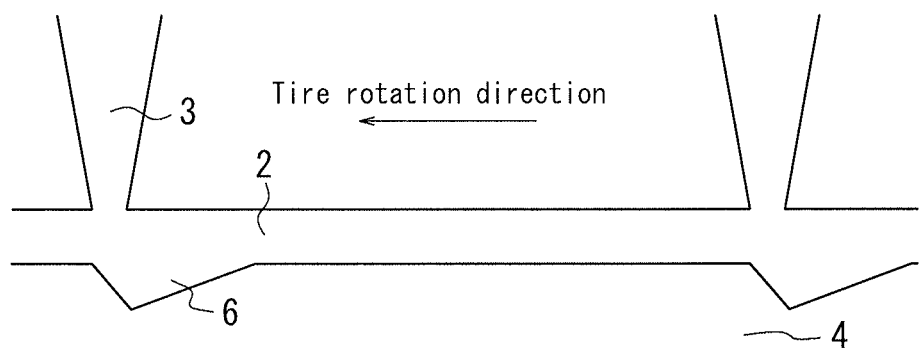
Figure 13C:
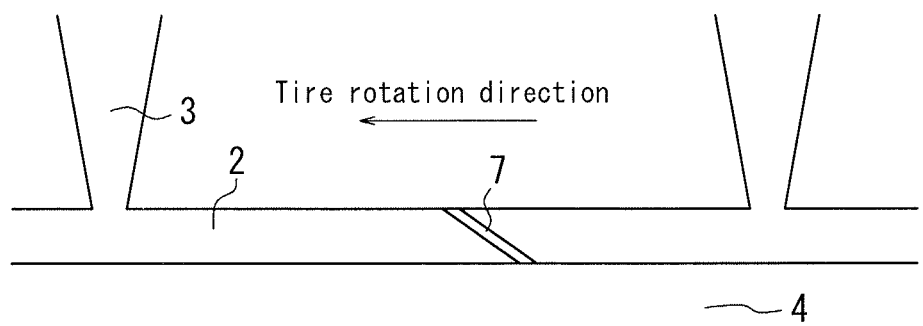

[*1]The projecting portions 7 were provided to be inclined, in a direction opposite to the corresponding direction of FIG. 12A, with respect to the circumferential groove 2 and not connected to one of the groove wall of the circumferential groove 2.
[*2]The projecting portions 7 were provided to be inclined, in a direction opposite to the corresponding direction of FIG. 12C, with respect to the circumferential groove 2.

TABLE 2

| Pattern | Comp. Example 4 FIG. 2A | Comp. Example 5 FIG. 2B | Example 8 FIG. 2D | Example 9 FIG. 2C | Example 10 FIG. 2E | Example 11 FIG. 2E | Example 12 FIG. 8D |
|---|---|---|---|---|---|---|---|
| Number of projecting portion 7 | None | None | 3 | 3 | 3 | 3 | 3 |
| Position of apex P of triangular recessed portion 6 | — | Within section "AB" | Out of section "AB" | Out of section "AB" | Out of section "AB" | Out of section "AB" | Out of section "AB" |
| Position of apex Q of triangular recessed portion 6 | — | Within section "AB" | Within section "AB" | Out of section "AB" | Q = B | Q = B | Q = B |
| θ1 (°) | — | 45 | 30 | 30 | 30 | 30 | 30 |
| θ2 (°) | — | 45 | 60 | 60 | 60 | 60 | 60 |
| Inclination angle of projecting portion 7 with respect to the groove center line WL of circumferential groove 2 (°)[*3] | — | — | 75 | 75 | 75 | 60 | 60 |

TABLE 2-continued

| Pattern | Comp. Example 4 FIG. 2A | Comp. Example 5 FIG. 2B | Example 8 FIG. 2D | Example 9 FIG. 2C | Example 10 FIG. 2E | Example 11 FIG. 2E | Example 12 FIG. 8D |
|---|---|---|---|---|---|---|---|
| Inclination of lateral groove 3 with respect to the tire widthwise direction (°) | Substantially parallel | Substantially parallel | Substantially parallel | Substantially parallel | Substantially parallel | Substantially parallel | Substantially parallel to groove wall face 62 |
| Cooling effect | 100 | 102 | 107 | 114 | 112 | 114 | 117 |

*3 The projecting portions 7 were provided to be inclined, in the direction corresponding to the groove side 62, with respect to the circumferential groove 2.

It is understood from comparing Example 1 with Comp. Example 1 that temperatures measured at the four measuring sites decreases by approximately 5° C., respectively, by provision of the recessed portions 6 and the projecting portions 7. Further, it is understood from comparing Examples 3 and 4 with Example 2 that increasing the number of the projecting portion 7 further decreases temperatures at at least two measuring sites.

Yet further, it is understood from comparing Example 5 with Example 3 that temperature measured at the circumferential ¾ point further decreases by providing the projecting portions 7 close to the groove wall face 62 forming the angle θ2. Yet further, it is understood from the results of Comp. Examples 4, 5 and Examples 8 to 12 that relative positions of apexes P, Q of the triangular recessed portion 6, in combination with inclination angle of the projecting portion 7 with respect to the tire widthwise direction and the like, significantly affects the cooling effect caused by the recessed portion 6 and the projecting portion 7.

REFERENCE SIGNS LIST

1 Tread surface
2 Circumferential groove
3 Lateral groove
4 Rib-shaped center land portion
5 Block-shaped land portion
6 Recessed portion
7 Projecting portion
21, 22 Groove wall
23 Groove bottom
31, 32 Groove wall
61, 62 Groove wall face

What is claimed is:

1. A pneumatic tire having in a tread surface at least one circumferential groove extending in the tire circumferential direction and plural lateral grooves, the lateral grooves each opening to the corresponding circumferential groove and having a narrower groove width than the circumferential groove in a portion opening to the circumferential groove and a wider groove width than the circumferential groove in the remaining portion thereof, comprising:
   a plurality of recessed portions formed in a groove wall of each circumferential groove, each of the recessed portions facing the corresponding lateral groove; and
   at least one projecting portion formed at a groove bottom of each circumferential groove between the recessed portions adjacent to each other in the tire circumferential direction,
   wherein, provided that angle θ1 and angle θ2 are formed by one groove wall face (61) and another groove wall face (62) constituting a recessed portion (6) of the plurality of recessed portions, respectively, with respect to an imaginary extension of a groove wall (21) extending in the tire circumferential direction, of each circumferential groove (2), in a plan view of the tread, 0°<θ1<θ2≤90° and the recessed portion has an unsymmetrical configuration in the plan view,
   provided that each recessed portion (6) is connected with the corresponding circumferential groove (2) at one connection point (6a) and the other connection point (6b) and that "point A" and "point B" represent intersections of imaginary extension lines of respective groove walls of each lateral groove (3) corresponding to the recessed portion, with the groove wall (21)/the imaginary extension of the groove wall (21) of the circumferential groove (2), respectively, at least one of the one connection point (6a) and the other connection point (6b) is formed beyond the point A/the point B and a region between the point A and the point B,
   wherein:
   the at least one projecting portion is inclined with respect to the direction orthogonal to the corresponding circumferential groove in the plan view of the tread,
   the groove wall face, forming the angle θ2, of each recessed portion is inclined in the same direction with respect to the corresponding circumferential groove as the at least one projecting portion corresponding to the circumferential groove is inclined with respect to the circumferential groove,
   each circumferential groove extends straight in the tire circumferential direction, and
   the pneumatic tire has in the tread surface at least two circumferential grooves each extending in the tire circumferential direction and plural lateral grooves each opening to the corresponding circumferential groove, and in an unworn state of the tire, each recessed portion of one circumferential groove has no groove connecting said recessed portion with the recessed portion of another adjacent circumferential groove,
   at least one of the imaginary extension lines of respective groove walls of each lateral groove (3) intersects the another groove wall face (62) of the corresponding recessed portion (6), and
   each of the at least one projecting portion is formed only at a position in the corresponding circumferential groove (2) between the groove wall face (62) forming the angle θ2 of one of the recessed portions adjacent to each other in the tire circumferential direction and a halfway position between the other connection point (6b) of the one of the recessed portions adjacent to each other in the tire circumferential direction and the other connection point (6b) of the other of the recessed portions adjacent to each other in the tire circumferential direction.

* * * * *